June 4, 1957 E. D. GOODALE ET AL 2,794,849

COLOR TELEVISION CAMERAS

Filed Dec. 29, 1951 2 Sheets-Sheet 1

INVENTORS
OSCAR B. HANSON
& ELMER D. GOODALE
BY
ATTORNEY

INVENTORS
OSCAR B. HANSON
& ELMER D. GOODALE
BY
ATTORNEY 2,794,849
Patented June 4, 1957

1

2,794,849

COLOR TELEVISION CAMERAS

Elmer Dudley Goodale, New Rochelle, N. Y., and Oscar B. Hanson, Westport, Conn., assignors to Radio Corporation of America, a corporation of Delaware Application December 29, 1951, Serial No. 264,052

The terminal fifteen years of the term of the patent to be granted has been disclaimed.

4 Claims. (Cl. 178—5.4)

This invention relates to apparatus for generating video signals representing the variations in intensity of the primary colors as an image is scanned.

One manner in which information as to the color of a scanned scene may be derived is to generate signals representing the intensity of the primary or selected component colors in color image elemental sequence. Thus the pulses representing the different primary colors are time division multiplexed. It has also been proposed that these pulses may be interleaved on successive scannings of a given line of the raster so as to increase the amount of detail represented by the signals in accordance with horizontal interlace principles.

It is an object of the present invention to provide improved means for deriving horizontal interlaced time division multiplexed color signals.

Briefly, this objective may be attained by employing a vertical strip type optical color filter whose successive strips transmit different selected component colors. The number of strips is an integral multiple of the number of pulses to be supplied to the transmission medium. During a first scanning of a given line of the raster, signals generated in response to the light passing through alternate strips are selected and passed on to the transmission medium. During a second scanning of the same line of the raster, the signals generated in response to light passing through the intermediate color strips are selected and passed to the transmission medium.

The manner in which the above objective may be attained will be more clearly understood after a detailed consideration of the drawings in which.

Figure 1:
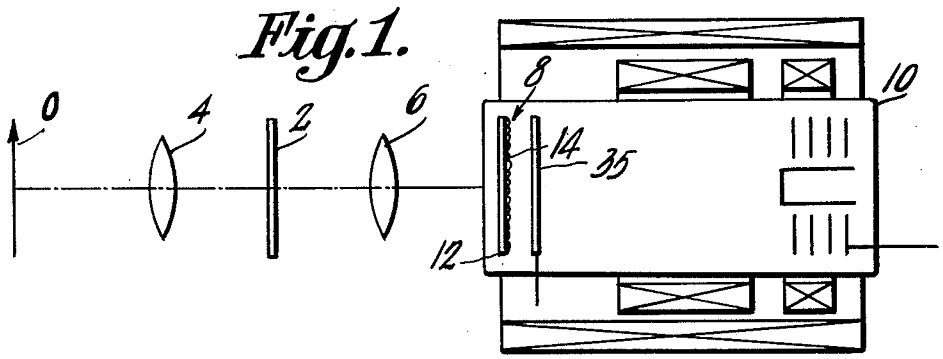
Figure 1 shows one optical arrangement whereby a color strip filter of the type described above may be employed in the invention.

In Figure 1 the object "O" to be scanned is focussed at the plane of a color line filter 2 by any suitable optical system 4. The image which is analyzed by the color line filter is then relayed by any suitable optical system 6 onto the plane of a target 8 in a cathode ray tube 10. A charge pattern is developed on the target 8 in accordance with the intensity of the light falling thereon. The target 8 may be comprised of a thin mica sheet 12 having a mosaic 14 of photoemissive substance on the scanned or beam side. Best results are obtained when the images of the color line filter 2 are brought into focus in the plane of the mosaic 14, as otherwise some diffusion may occur owing to the fact that light through one color optical filter strip may fall on areas on the mosaic 14 that are in registry with other color filter strips.

2

Figure 2:
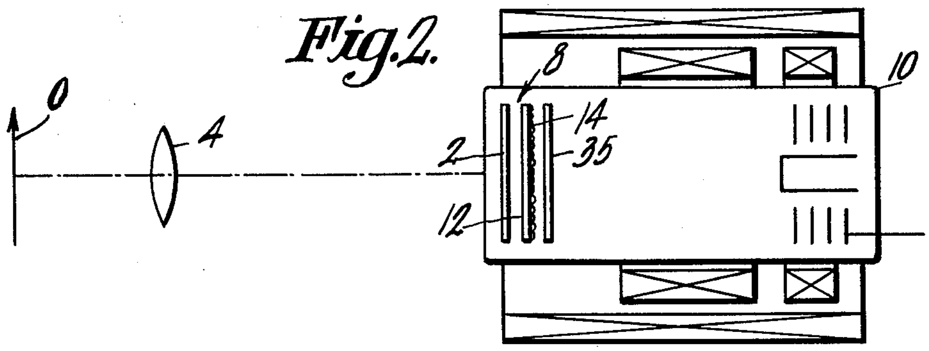
Figure 2 illustrates another optical arrangement for using a color strip filter in this invention.

Another general arrangement of the type of pickup camera employed in this invention is illustrated in Figure 2. The optical color filter 2 is mounted inside the cathode ray tube 10 on the object side of the thin mica sheet 12. As the mica sheet 12 is sufficiently thin, light passing through the differently colored strips of the filter 2 will not land on portions of the mosaic 14 that are opposite or in registry with other color filter strips.

Figure 3:
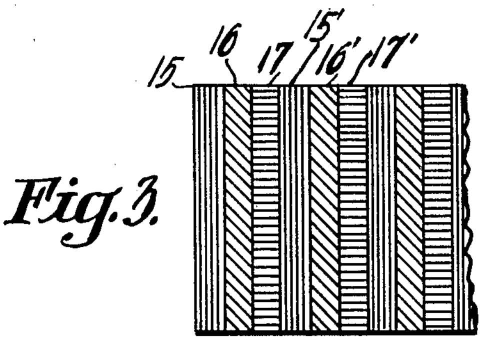
Figure 3 illustrates the color strip filter itself.

One form that the color filter 2 may assume is illustrated by enlargement in Figure 3. Each successive one of the uniform vertical strips is adapted to transmit light of a different primary color. The strips are arranged in sequence so that a strip 15 passes red light, a strip 16 green light, a strip 17 passes blue light, a strip 15' passes red light, a strip 16' passes green light and a strip 17' passes blue light, etc. The total number of color strips is a whole multiple of the number of color pulses to be derived and generated as the active portion of one line of a raster is being scanned.

Figures 4, 5:
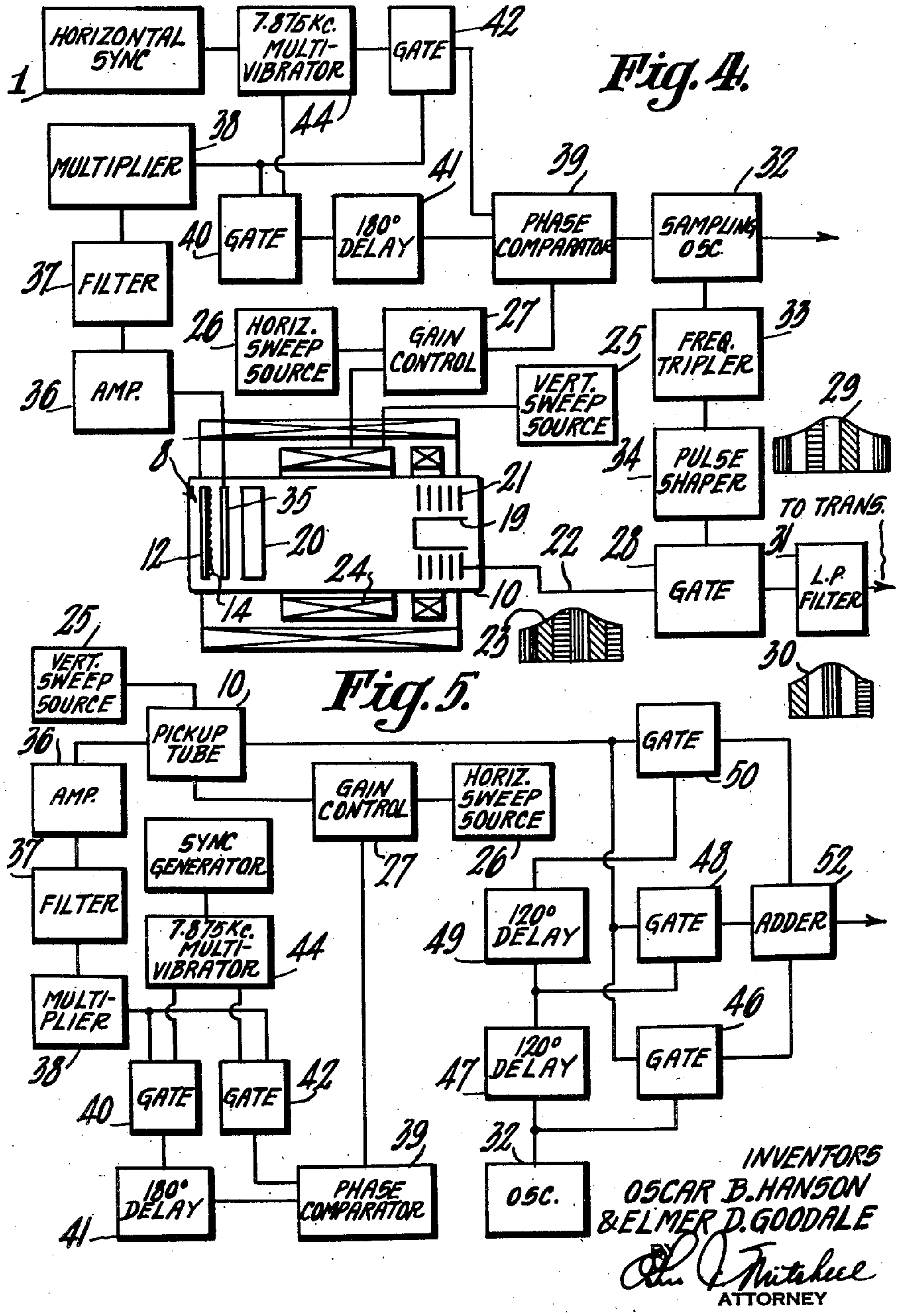
Figure 4 illustrates in block diagram form the combination employing the present invention.
Figure 5 illustrates another way in which the signal may be derived from the pickup tube in accordance with the invention.

Figure 4 illustrates the circuitry that may be used in one form of the present invention. The cathode ray tube 10 as shown is an orthicon type tube in which the beam of electrons is focussed by an axial magnetic field established by a focussing coil 18. An electron gun 19 of normal construction directs a beam of electrons toward the target 8. Due to the decelerating action of a decelerating ring 20 the electrons arrive at the target 8 with nearly zero velocity. Thus electrons not required to discharge the charge pattern built up on the mosaic 14 return to a collector 21, which may take the form of an electron multiplier, and build up a voltage wave on an output lead 22 such as indicated by the graph 23. Vertical scansion of the beam is produced by the application of saw-tooth waves of field frequency to the vertical deflection coil in a deflection yoke 24. The vertical deflection waves are generated in the source 25 of any standard construction. Horizontal deflection of the beam is produced by applying saw-tooth waves of line frequency that are generated by a source 26 via a variable gain control 27 to the horizontal deflection coils in the yoke 24.

The horizontal saw-tooth waves provided by the source 26 are assumed for purposes of the present discussion to produce linear deflection of the electron beam. As the beam scans across the mosaic 14 behind each of the optical filter strips 15, 16, 17, 15', 16', 17' etc., it produces a signal pulse which is applied to a gate 28. The number of optical filter strips 15, 16 and so forth is selected so that the number of pulses generated by the horizontal scanning action of the beam is double the number of pulses which can be handled by the transmission medium. Therefore in the present embodiment, means are provided to operate the gate 28 so as to select every other one of the pulses supplied to it from cathode ray tube 10, for example the pulses formed as the beam scans the areas behind the strips 15, 17 and 16'. In this way the wave form 23 appears as wave form 29 during a first scanning of a line of the raster. It should be noted that the successive pulses in the wave form 23 correspond to the selected component colors in the repeated sequence of red, green, blue, red, etc. and that the wave form 29 produces the reverse sequence of primary colors namely red, blue, green, red, etc. The means controlling the gate 28 is so adjusted that on a second scanning of a given line the intermediate pulses of the wave form 23, those formed as the beam scans across the intermediate strips 16, 15' and 17' etc., are selected as indicated by the wave form 30. The sequence with which these latter pulses represent the selected component colors is the same as in the case of wave form 29. However, these pulses are horizontally interlaced as can be seen by comparing the wave forms 29 and 30. If there is to be no crosstalk, the pulses in the wave forms 29 and 30 may then be applied to a low pass filter 31 having an upper frequency limit equal to twice the number of pulses in the wave forms 29 and 30 or equal to the number of pulses in the wave form 23. The frequency response characteristic of the filter 31 corresponds to the frequency response of the transmission medium. If the pulses in the wave form 23 were applied to a transmitter, the transmitter would have to be capable of handling twice as high a frequency as it does in the present case wherein the wave forms 29 and 30 are applied to the transmitter at different times.

In any time division multiplex color television system wherein the signal transmitted sequentially represents the intensity of the different primary colors, means must be provided for synchronizing the sampling rates at the transmitter and receiver. For this reason, the sampling frequency is established by a sampling oscillator 32 and bursts of this sampling oscillator output can be placed upon the back porch of the horizontal blanking pulse so as to synchronize the sampling operation at the receiver in a manner described in RCA Bulletins on Color Television and UHF, October 1949 to July 1950.

The sampling at the transmitter in Figure 4 is accomplished by tripling the sampling frequency supplied by the sampling oscillator 32 in a standard frequency tripler 33. A pulse shaper 34 may be used if desired to form a sharp pulse during each cycle of the triple sampling frequency. These pulses are applied to the gate 28 so as to render it capable of passing every other pulse in wave form 23.

It is arranged that the pulses supplied by the pulse shaper 34 undergo a 180° phase change with respect to the line scanning interval between successive scannings of a given line of the raster in order that the pulses represented by the wave form 29 will be produced during a first scanning of the line and that the horizontally interlaced pulses represented by the wave form 30 will be produced on a second scanning of that line. This is perhaps most easily done by selecting a sampling frequency that is so related to the line scanning frequency that it is 180° out of phase on successive scannings of any given line on the raster. This has been more fully discussed in the RCA publication noted above.

It has been assumed in the above discussion that the horizontal saw-tooth waves applied by the source 26 are of such character as to cause the beam in the cathode ray tube 10 to traverse the target 8 in linear fashion. Whereas suitable linear scanning may be produced in this direct manner, it is often advisable to secure linear scanning by employing scanning correction means. One way in which this may be accomplished is as follows. A grid 35 having vertical conducting wires is inserted between the target 8 and the electron gun 19. As the electron beam scans across these vertical grid wires, signal pulses are generated at a frequency depending on the spacing of the grid wires. After suitable amplification in amplifier 36, this particular frequency is selected by a narrow pass band filter 37. The number of grid wires could be made so numerous that the pulses generated as the beam scans them have the same frequency as that supplied by the sampling oscillator 32. However as a practical matter it is preferable that the number of grid wires be reduced so as to produce signals that are some submultiple of the sampling frequency. In such an arrangement, the output of the filter 37 is a submultiple of the sampling frequency supplied by the oscillator 32, but after multiplication in a multiplier 38 it has the same frequency as the sampling oscillator 32. The output of the multiplier 38 is therefore indicative of the horizontal position of the scanning beam.

As explained above, horizontal interlace is obtained when the voltage waves supplied by the sampling oscillator are 180° out of phase with respect to the line scanning interval on successive scans of the same line. On the other hand, the beam scans each line in the same manner so that the control signals supplied by the grid 35 and hence the multiplier 38 have the same phase relationship to every line scanning interval. Then during one scan of a given line, the control voltage and the output of the sampling oscillator 32 would be substantially in phase, but they would be substantially 180° out of phase on a second scan of the line. If the linearity of scanning were controlled by a direct comparison, the control mechanism would always keep them in phase. This means that the beam would always be opposite the same set of filter strips, say 15, 17, 16' etc. when the gate 28 is open. Signals from intermediate strips 16, 15' and 17' would never pass the gate and the interlace would be lost. Therefore whenever the control signals would normally be 180° out of phase with the oscillator 32, one or the other must be changed by 180°. In present standard practice there is an odd number of scanning lines for each two fields and therefore if the phase of the control signal is reversed after each line, it will be 180° out of phase with respect to any line on any two successive scans.

This phase reversal at line rate can be effected by applying the control frequency to two gates 40 and 42. A 7.875 kc. multivibrator 44 is synchronized by line frequency pulses that are readily attained in any standard sync generator 1. One side of the multivibrator controls the gate 40 and the other side controls the gate 42 so that one is open during one line and the other during the next. A 180° delay line 41 may be inserted between the gate 40 and the input to the phase comparator 39, but the gate 42 is directly connected to the input of the comparator.

It is important that the gate 28 be operated in such manner that it pass signals only when the beam is centered on one of the strips 15, 16, 17, etc. Accordingly the phase of the output of the multiplier 38, after passing through one of the gates 40, 42, is compared with the phase of the output of the sampling oscillator 32 in a phase comparator 39. This is one means for synchronizing the rate at which the signals 23 are derived by the pickup tube with the operation gate 28 to which they are applied. The output of the phase comparator 39 is applied to the gain control device 27 so as to control the instantaneous amplitude of the horizontal deflection voltage applied to the horizontal coil in the yoke 24. Thus if the electron beam scans too slowly, the gain of the gain control device 27 is increased, the amplitude of the voltage applied to the horizontal deflection coils is increased, and the beam speeds up. A similar system for controlling linearity is described in the United States Patent 2,385,563 issued to George L. Beers in 1945.

As an alternative, the proper synchronizing between the gating operation and the position of the electron beam with respect to the strips 15, 16, 17, etc. could be effected by controlling the sampling oscillator 32 by the signals generated as the beam scans across the grid 35. However, this would produce changes in the sampling frequency that are dependent on the linearity of the scanning in the pickup tube 10. Such changes in sampling frequency would normally be undesirable and therefore it is felt that an arrangement similar to that of Figure 4, wherein the scanning is controlled in accordance with the sampling frequency, is preferable.

Figure 5 illustrates another manner in which the signals supplied by the pickup tube 10 may be gated to the transmitter. Components corresponding to those shown in Figure 1 are indicated by like numerals. The output of the oscillator 32 is supplied directly to a first gate 46, via a delay means 47 to a second gate 48, and via the delay means 49 to the third gate 50. The signals supplied by the pickup tube 10 are applied to each of the gates 46, 48 and 50. The outputs of the gates are combined in an adder 52 before being supplied to the transmitter. The linearity of the scanning is controlled as before.

In the apparatus described above the selected component colors were segregated by optical strip filters, but it will be apparent to those skilled in the art that the color segregation could be performed in a variety of ways without departing from the invention.

Having thus described the invention, what is claimed is:

1. A color television camera comprising in combination a pickup tube including means for generating a beam of electrons, a beam target structure, means for causing said beam to trace a scanning raster on said target, and means for deriving an image representative signal from said pickup tube in response to the scanning of said target by said beam, a plurality of color selective optical filter means associated with said target structure for determining the color component of said image represented by said derived signal during the tracing of said scanning raster, said color selective means being disposed relative to the scanning raster traced on said target such that the image color component represented by said derived signal periodically varies in a first predetermined sequence of component colors during the tracing of said scanning raster, signal gating means coupled to said pickup tube and adapted to receive said derived signal, and gate control means coupled to said signal gating means for causing the signal output of said signal gating means to be successively representative of said image color components in a second predetermined sequence of component colors differing from said first predetermined sequence.

2. A color television camera in accordance with claim 1 wherein said gate control means includes a source of keying pulses having a predetermined repetition rate, and including means for synchronizing said keying pulse source with said means for causing said beam to trace a scanning raster.

3. A color television camera in accordance with claim 2 wherein said keying pulse repetition rate is an even multiple of the rate of said periodic variation of the image color components represented by said derived signal.

4. A color television camera in accordance with claim 2 wherein said gate control means includes means applying said keying pulses to said signal gating means to effect a selective gating of said derived signal during alternate periods of color component representation thereby in said first predetermined sequence.

References Cited in the file of this patent

UNITED STATES PATENTS

| | | |
|---|---|---|
| 2,431,115 | Goldsmith | Nov. 18, 1947 |
| 2,570,790 | Gray | Oct. 9, 1951 |
| 2,606,962 | Valensi | Aug. 12, 1952 |
| 2,627,549 | Kell | Feb. 3, 1953 |

OTHER REFERENCES

"Six Megacycle Color Television," Television, vol. VI, pages 270–290, published by RCA Review.

"Analysis of the Sampling Principles of the Dot-Sequential Color Television System," Television, vol. VI, pages 291–322, published by RCA Review.